May 27, 1930.  J. A. REKENTHALER  1,760,719
TIRE SPREADER
Filed Oct. 20, 1927   2 Sheets-Sheet 1
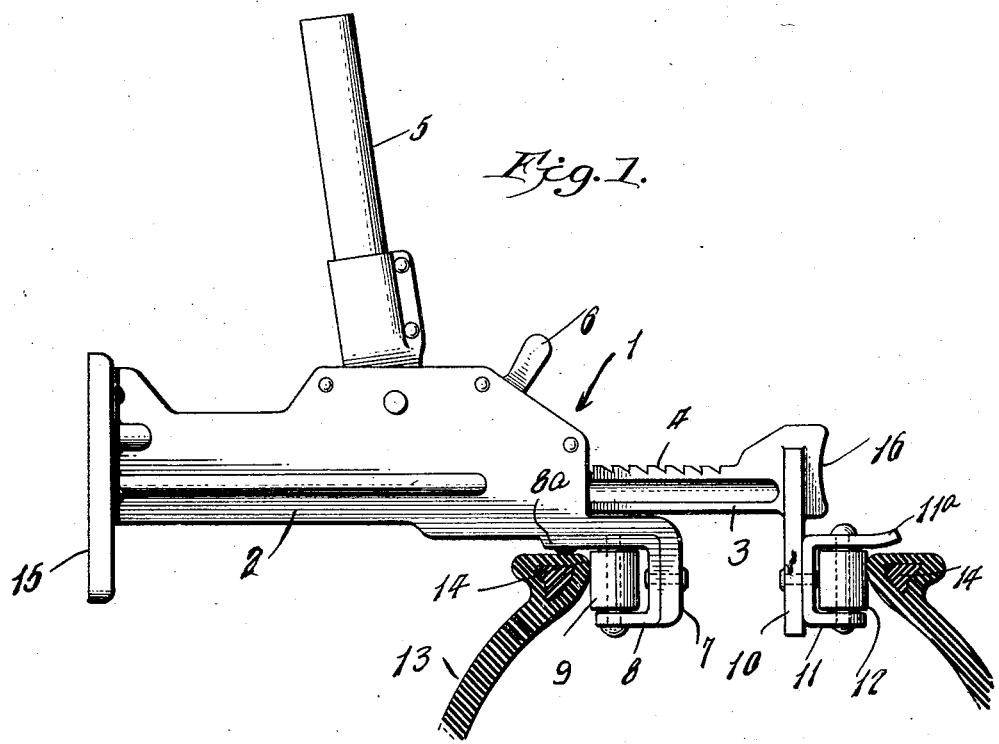
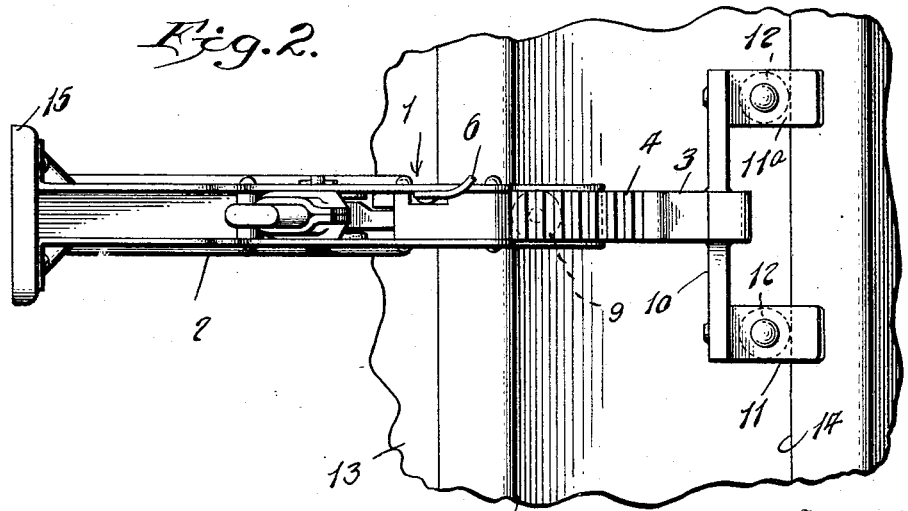
Inventor
J. A. Rekenthaler.
Attorney

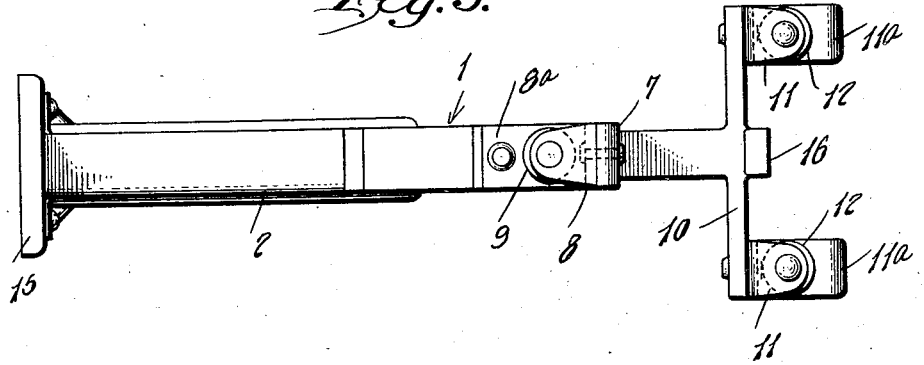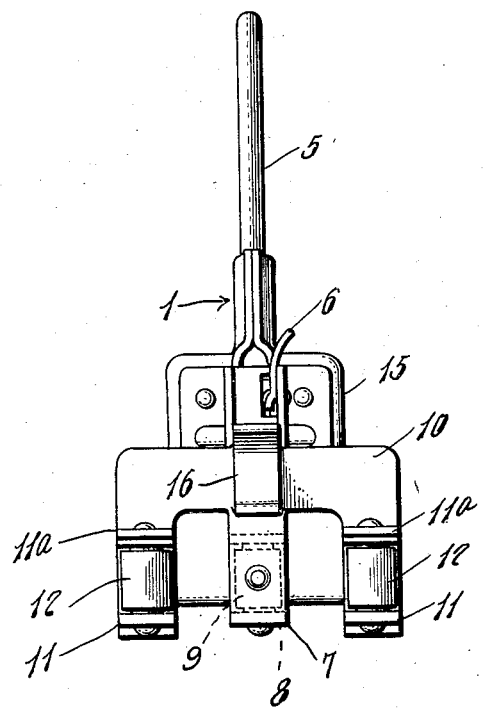

Patented May 27, 1930

1,760,719

UNITED STATES PATENT OFFICE

JOSEPH A. REKENTHALER, OF CUSHING, IOWA

TIRE SPREADER

Application filed October 20, 1927. Serial No. 227,567.

This invention relates to tools, and has for one of its objects to provide a novel, simple and highly efficient tool that is adapted for use as a tire spreader.

With the foregoing and other objects in view, the nature of which will become apparent as the description proceeds, the invention consists of the construction, combination and arrangement of parts hereinafter fully described and claimed, and illustrated in the accompanying drawings, wherein:

Figure 1 is a view illustrating the manner in which the tool is adapted to be used to effect the spreading of a tire casing, the tool being shown in side elevation and the tire casing in vertical section, Figure 2 is a top plan view of the tool and tire casing, Figure 3 is a bottom plan view of the tool, and Figure 4 is a view in front elevation of the tool.

The tool comprises an extensible member 1 which consists of a telescopically associated base 2 and bar 3 and a ratchet mechanism by means of which the members 2 and 3 may be extended with respect to each other to effect the extension of the member 1. The ratchet mechanism, which may be of the type used in connection with automobile jacks, is carried by the base member 2 and cooperates with teeth 4 formed on the bar member 3. The ratchet mechanism includes a lever 5 by means of which it may be actuated to effect the extension of the bar 3, and a lever 6 by means of which it may be operated when it is desired to retract the bar, this mechanism being conventional in automobile lifting jacks.

The base member 2 is provided at its front end and under side with a downwardly extending lug 7. A bearing bracket 8 is secured to the under side of the base member 2 and to the rear side of the lug 7. The rear side of the bearing bracket 8 is fully opened, and journaled in the bearing bracket is a roller 9. A cross head 10 is secured to the front end and under side of the bar member 3 and extends transversely of the bar member. The cross head 10 is secured to the bar member 3 centrally between its ends and extends for an equal distance beyond the lateral or vertical sides of the bar member. Bearing brackets 11 are secured to the ends and front side of the cross head 10, and are fully open at their front sides. Rollers 12 are journaled in the bearing brackets 11. The bearing bracket 8 is provided with an extension 8$^a$ which projects rearwardly beyond the roller 9, and the bearing brackets 11 are provided with extensions 11$^a$ which project forwardly beyond the rollers 12. The rollers 9 and 12 are vertically arranged and the extensions 8$^a$ and 11$^a$ are located above the rollers. The rollers 12 are situated forwardly of and laterally beyond the roller 9, and as the member 1 may be expanded and contracted the rollers 12 may be adjusted forwardly and rearwardly with respect to the roller 9.

In practice, when it is desired to spread a tire casing for the purpose of repairing or cleaning the same or for the purpose of examining the interior thereof, the tool is applied to the tire casing 13 in a manner to position the rollers 9 and 12 between the inner edges or beads 14 of the tire casing. When the tool is applied, the member 1 is in contracted condition. By first operating the lever 6 to render the ratchet mechanism operative and thereafter rocking the lever 5, the bar 3 will be extended with the result that the adjacent edges or beads 14 of the tire casing 13 will be separated. The rollers 9 and 12 prevent injury to the inner edges or beads 14 during the spreading of the tire casing 13, and also permit the tool to be moved circumferentially about the tire casing. The bearing bracket extensions 8$^a$ and 11$^a$ prevent the edges or beads 14 of the tire casing 13 from moving out of contact with the rollers 9 and 12 during the spreading of the tire casing 13 and while the tool is being moved circumferentially with respect to the tire casing. After the work on the tire casing 13 is completed, the lever 6 is moved to render the ratchet mechanism ineffective, and by now rocking the lever 5 the member 1 is contracted, and when contracted the tool may be easily removed from the tire casing.

The base member 2 is provided at its rear end with a plate 15 which constitutes a base for the tool and when seated thereon may be used as an automobile lifting jack, the front end of the bar member 3 being formed to provide a load rest 16.

It should be understood that the drawings are merely illustrative and do not pretend to give exact proportions. Furthermore, the said drawings are illustrative of a preferred construction, it being my expectation that various changes and modifications may be made within the spirit and scope of the appended claim.

What is claimed is:—

A tool of the character set forth, comprising a bar consisting of telescopically associated members, means by which the members may be adjusted relatively to effect the extension of the bar, a downwardly extending lug on the front end of one of the members, a bearing bracket secured to said member and to the rear side of the lug and fully open at its rear side, a roller journaled in the bearing bracket, a cross head on the front end of the other member and extending laterally beyond the same, bearing brackets secured to the front side of the cross head and fully open at their front sides, and rollers journaled in the bearing brackets, said bearing brackets being of U-shape and having their upper arms extended outwardly beyond the rollers and the lower arms, so that they may engage the edge portions of a tire.

In testimony whereof I affix my signature.

JOSEPH A. REKENTHALER.